(12) United States Patent
Elliott

(10) Patent No.: US 8,485,607 B2
(45) Date of Patent: Jul. 16, 2013

(54) MULTIPLE ACTIVATED DUMPING ROLL-OFF CONTAINER

(76) Inventor: C. Scott Elliott, Lynchburg, VA (US)

( * ) Notice: Subject to any disclaimer, the term of this patent is extended or adjusted under 35 U.S.C. 154(b) by 84 days.

(21) Appl. No.: 13/192,911

(22) Filed: Jul. 28, 2011

(65) Prior Publication Data

US 2012/0025590 A1 Feb. 2, 2012

Related U.S. Application Data

(60) Provisional application No. 61/368,708, filed on Jul. 29, 2010, provisional application No. 61/389,598, filed on Oct. 4, 2010.

(51) Int. Cl.
*B60P 1/04* (2006.01)
(52) U.S. Cl.
USPC .......................................... 298/1 A; 298/18
(58) Field of Classification Search
USPC 298/1 B, 8 R, 8 T, 13, 17.7, 18, 1 A; 414/498
See application file for complete search history.

(56) References Cited

U.S. PATENT DOCUMENTS

| | | | |
|---|---|---|---|
| 1,013,789 A | 1/1912 | Longest | |
| 2,702,142 A | 2/1955 | Jones | |
| 2,760,815 A | 8/1956 | La Borde | |
| 2,072,998 A | 3/1957 | Allin | |
| 3,964,791 A | 6/1976 | Griffis | |
| 4,119,222 A | 10/1978 | Kaarnametsa | |
| 4,975,019 A | 12/1990 | Cate et al. | |
| 5,447,361 A * | 9/1995 | Phillips | 298/1 A |
| 5,749,630 A | 5/1998 | Ung | |
| 5,845,971 A | 12/1998 | Rogers | |
| 5,848,869 A | 12/1998 | Slocum et al. | |
| 5,967,615 A | 10/1999 | Rogers | |
| 6,179,385 B1 | 1/2001 | Rogers | |
| 6,199,955 B1 | 3/2001 | Rogers | |
| 6,814,396 B2 | 11/2004 | Greer et al. | |
| 6,834,917 B2 | 12/2004 | Hanna | |
| 6,902,226 B1 | 6/2005 | Taylor | |
| 7,111,907 B2 | 9/2006 | Boon | |
| 7,207,631 B1 | 4/2007 | Schwinbt | |
| 7,360,843 B1 | 4/2008 | Rogers | |
| 7,478,883 B1 | 1/2009 | Rogers | |
| 7,722,125 B1 | 5/2010 | Hehn | |
| 2006/0285959 A1 | 12/2006 | Warhurst | |

FOREIGN PATENT DOCUMENTS

| | | |
|---|---|---|
| EP | 0550056 | 7/1993 |
| GB | 2461722 A | 1/2010 |

OTHER PUBLICATIONS

International Search Report for corresponding international application No. PCT/US2011/045760, mailed on Dec. 29, 2011.

\* cited by examiner

*Primary Examiner* — Stephen Gordon
(74) *Attorney, Agent, or Firm* — Goodman, Allen & Filetti PLLC; Matthew R. Osenga

(57) ABSTRACT

A roll-off container is provided having multiple separate compartments that may be filled and dumped independently of each other. A master controller is provided that is used to separately and selectively control the lifting and dumping of each compartment. The system may be powered by the engine of a roll-off truck on which it is located, or by a separate gasoline engine, propane engine, solar power system, electric power system, battery-operated power system or any future powering technology located within the roll-off container. All components of the system are located within or are supported by a chassis.

26 Claims, 13 Drawing Sheets

MULTIPLE ACTIVATED DUMPING ROLL-OFF CONTAINER

CROSS-REFERENCE TO RELATED APPLICATIONS

This application claims the benefit of U.S. Provisional application Nos. 61/368,708, filed Jul. 29, 2010, and 61/389,598, filed Oct. 4, 2010. The contents of each application are expressly incorporated herein by reference.

FIELD OF INVENTION

The present invention relates to roll-off containers or dumpsters. More specifically, the invention relates to multiple compartment activated dumping roll-off containers.

BACKGROUND OF THE INVENTION

Roll-off containers are used in many applications for the collection and transportation of numerous materials, especially waste materials. These containers are used at residential, commercial, and industrial construction sites to collect and transport waste material, refuse, and debris. They are also used to transport bulk materials, parts, finished products, and components in large quantities.

A large container, typically having a rectangular footprint, is brought to the construction site or other location where it will be filled with waste or other materials. Once the roll-off container is filled or is otherwise ready to be moved, the container is loaded onto a truck that is designed to transport the roll-off container. The truck typically includes a hydraulically operated hoist for lifting the bed of truck to permit the container to be loaded or unloaded from the rear of the truck. A cable and winch system and/or a hook lift system may be used to assist with loading or unloading the container from the truck.

Currently roll off containers and dumping devices mix all content together in one volume as to where this invention segregates material and dumps them individually. Currently roll off waste containers come in many different sizes and shapes. Some typical sizes are 8, 10, 20, 30 and 40 yard waste containers, with measurements based on the volume of waste that can be held in cubic yards. Materials are collected in one single container and the waste is transported to a landfill or an intermediate processing facility (IPF).

With an increased emphasis on sorting and recycling in recent years, it is often necessary to include multiple roll-off containers at a single site. This can result in the need to make multiple trips between the site where the container is located and the ultimate dumping or emptying site.

Another option is to use a single container while loading different areas of the container with different material. Barriers or other devices could be added to the container to keep the various materials separated. This could permit the use of a single roll-off container at the site, and therefore a single trip to drop off and a single trip to pick up the loaded container. Some major disadvantages with this set up is the difficulty to keep the materials separated from each other, and even more so to dump or empty the different materials in different places. Thus, there is a need for a multiple compartment, multiple activated dumping roll-off container.

SUMMARY OF THE INVENTION

The invention provides various exemplary embodiments, including apparatus and systems of roll-off containers that include separately and independently controlled and activated compartments.

These and other features and advantages of exemplary embodiments of the invention are described below with reference to the accompanying drawings.

DETAILED DESCRIPTION

In the following detailed description, numeric ranges are provided for various aspects of the embodiments described. These recited ranges are to be treated as examples only, and are not intended to limit the scope of the claims. In addition, a number of materials are identified as suitable for various facets of the embodiments. The recited materials are to be treated as exemplary, and are not intended to limit the scope of the claims.

As used herein, the terms "container" or "receptacle" generally refer to large containers whose contents are measured by the number of cubic yards they can hold. For example, typical sizes for such containers include 10 yards, 20 yards, 30 yards, and 40 yards, although larger and smaller may also be used, as well as sizes between these sized containers. A "waste container" or "waste receptacle" is a container, receptacle, or dumpster whose primary purpose or use is to hold and transport waste, debris, refuse, or the like. A "dumpster," "dumping container," or "dumping receptacle" refer to such containers or receptacles that are designed or configured such that they are to be dumped to empty the contents therefrom. The dumping could take place in a various ways and with various types of equipment, such as with a truck.

A "roll-off" container, receptacle, or dumpster refers to a container that is designed or configured to be transported by roll-off trucks. The container rolls onto and off the trucks on wheels, casters, or the like.

The term "compartment" as used herein refers to a section or volume into which the container, receptacle, or dumpster is divided. The compartments may or may not be connected or adjoining, but they do form a part of a single containment unit.

A "chassis" refers to an internal framework that supports or houses one or more objects. For example, a container chassis is designed to support or house various components of the container system together.

The system and apparatus described herein permits the user to separate materials into multiple compartments to permit them to be separately recycled. The system and apparatus are suitable for many types of industries and applications, while being ideally suitable for the construction industry by reducing landfill waste in an efficient manner. The system and apparatus may be used with similar chassis used on existing roll-off containers, and will thus work seamlessly with existing roll-off dumpster trucks.

Figure 1:
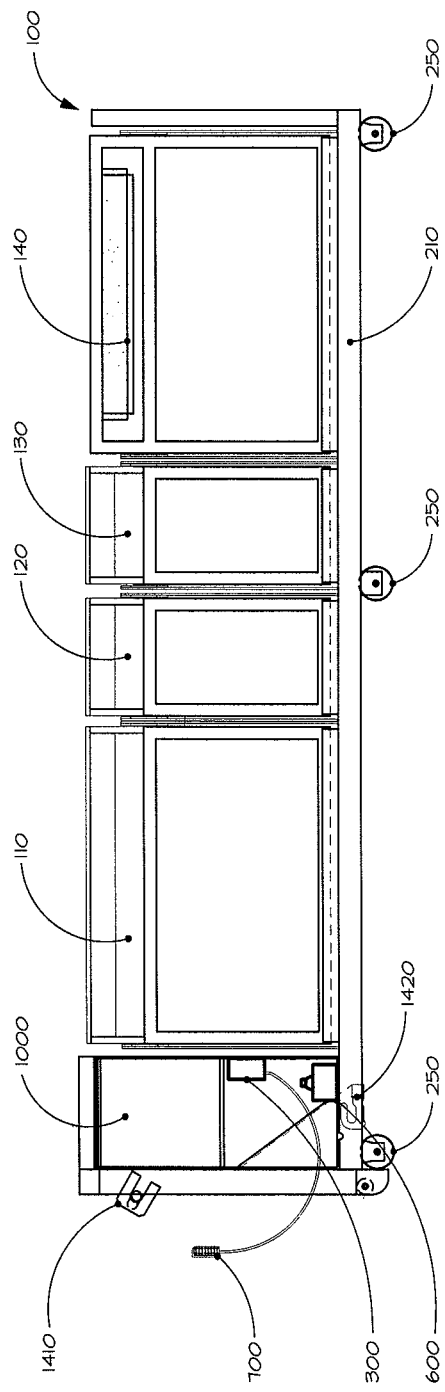
FIG. 1 is a side elevation view of a roll-off container having multiple compartments.
Figure 8:
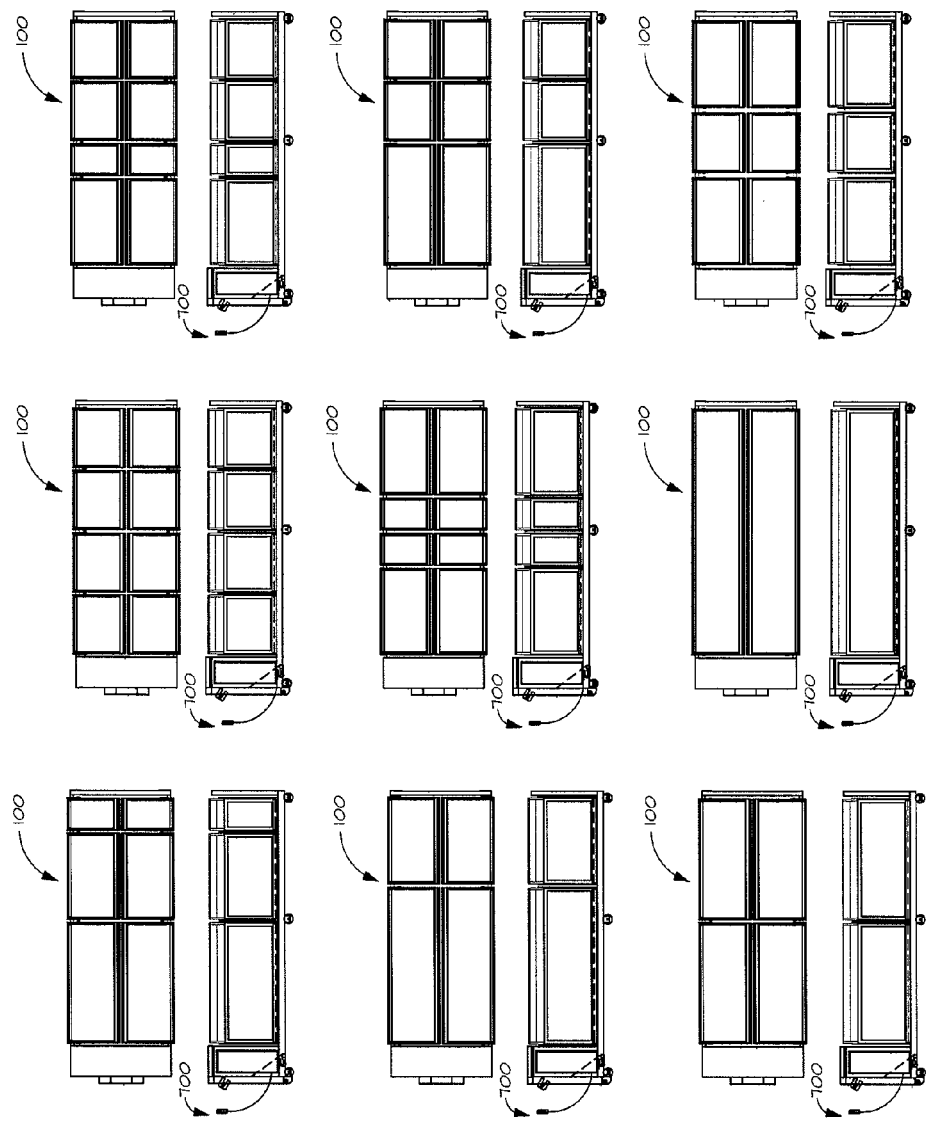
FIG. 8 is a plan view of various configurations for roll-off containers and master controllers as shown in FIGS. 1 and 7.

FIG. 1 shows roll-off container 100 that includes separate compartments 110, 120, 130, 140. Four compartments are shown for illustrative purposes, but any number of compartments may be used in a single roll-off container 100 as determined by the particular application desired. A typical roll-off container 100 may include two to ten separate compartments, but may include 2, 4, 6, 8, or 10 compartments, or a different number of compartments. As seen in FIG. 8 below, a similar or different number of separate compartments may be used on the opposite side of roll-off container 100.

Each compartment 110, 120, 130, 140 may be filled with separate materials that can then be emptied or dumped separately, as illustrated below. For example, it may be desirable to fill compartment 110 with plastic, compartment 120 with steel, compartment 130 with asphalt, and compartment 140 with wood. This would be an example of how roll-off container 100 could be used at a construction site to separate various waste materials.

Compartments 110, 120, 130, 140 are units manufactured to any required dimension in order to accommodate the material they are intended to hold. Compartments 110, 120, 130, 140 are preferably made of a durable material such as aluminum or steel.

Roll-off container 100 typically includes wheels or casters 250 that are used to move the container, as well as to load and unload roll-off container 100 from the truck, as illustrated below. Additional components, described below, can be found within housing 1000.

Figure 2:
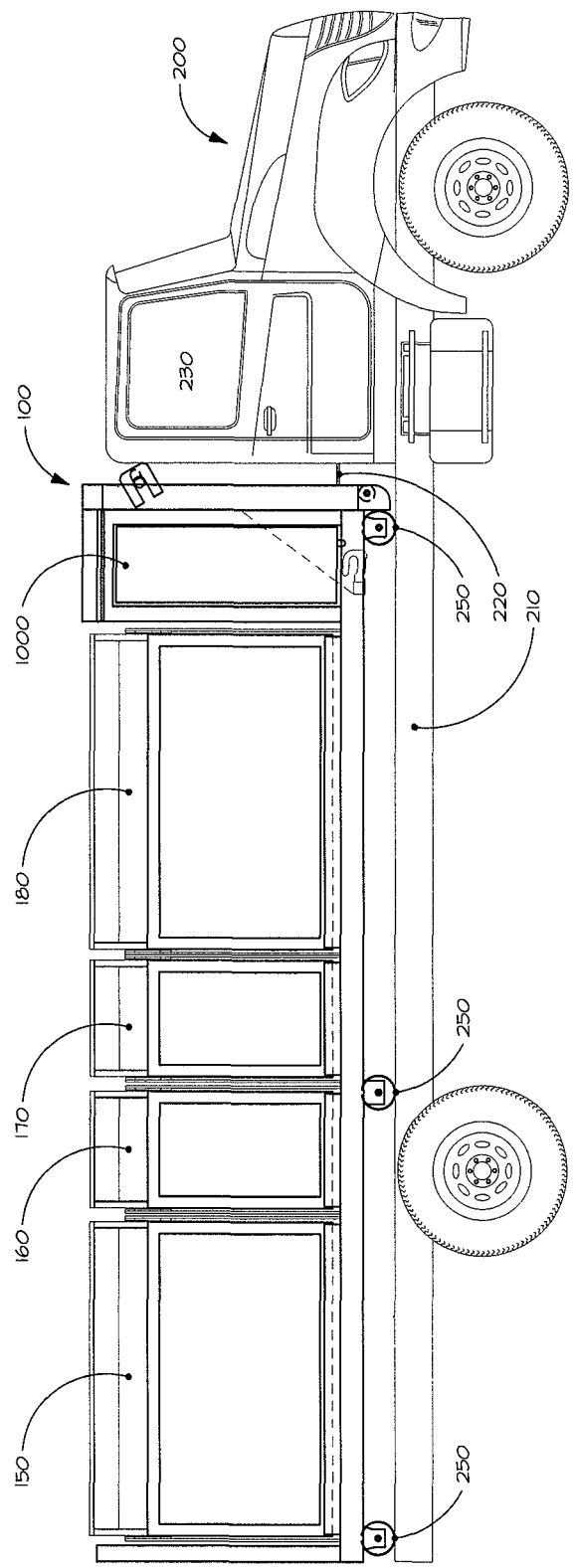
FIG. 2 is a side elevation view of a roll-off container as in FIG. 1 on a truck.

FIG. 2 shows roll-off container 100 that includes compartments 150, 160, 170, 180 as in FIG. 1. Roll-off container 100 has been loaded onto truck 200; wheels or casters 250 of roll-off container 100 rest on truck bed 210. Truck 200 may be an existing truck, such as a hook lift or cable hoist truck.

A connection, such as plug 220, provides power from truck 200 to roll-off container 100 to permit dumping of compartments 150, 160, 170, 180 remotely from within cab 230 of truck 200, as described in further detail below. Other system components reside within housing 1000.

Figure 3:
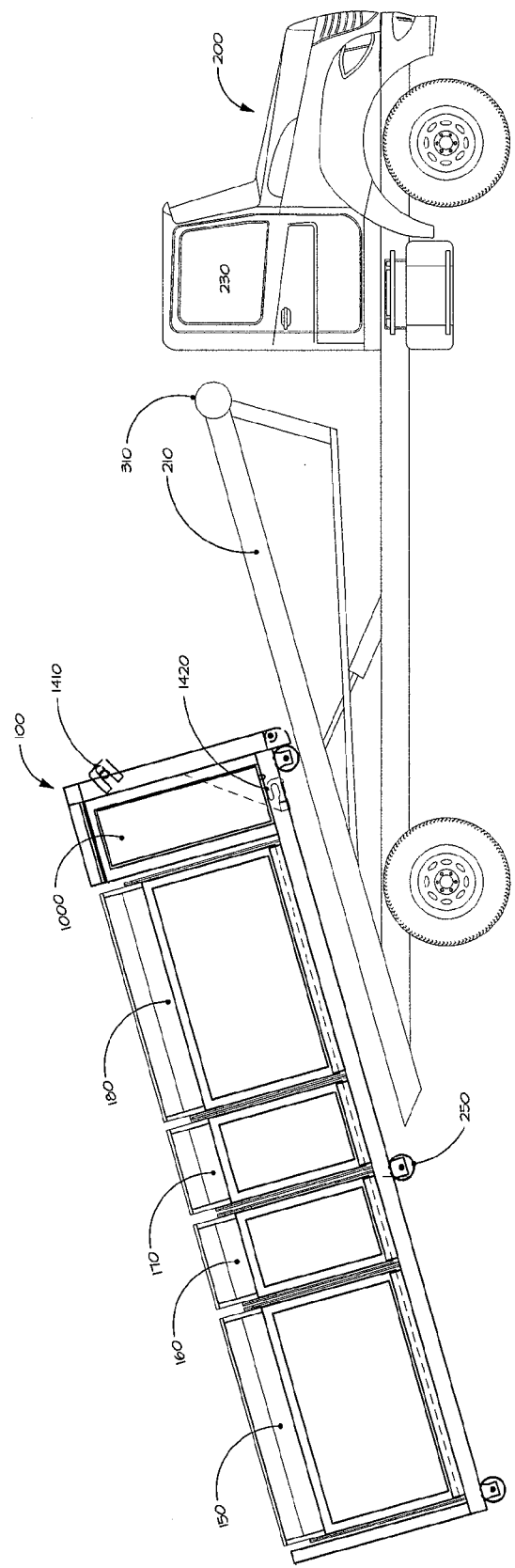
FIG. 3 is a side elevation view of a roll-off container being loaded or unloaded onto a truck as in FIG. 2.

FIG. 3 shows roll-off container 100 including compartments 150, 160, 170, 180, as in FIG. 2. Roll-off container 100 is being loaded or unloaded onto bed 210 of truck 200. Bed 210 of truck 200 will typically be raised to permit roll-off container 100 to be loaded or unloaded. Roll-off container 100 rolls on wheels or casters 250 onto or off of truck bed 210. Roll-off container 100 includes hook lift attachment 1410 and cable rail attachment 1420, as discussed below. These attachments permit the truck to hoist roll-off container 100 onto truck bed 210.

Truck 200 also includes tarping system 310 that is also used for loading and unloading of roll-off container 100. Roll-off container 100 can be connected to tarping system 310 to permit roll-off container 100 to use power from tarping system 310 to operate dumping of compartments 150, 160, 170, 180.

Figure 4:
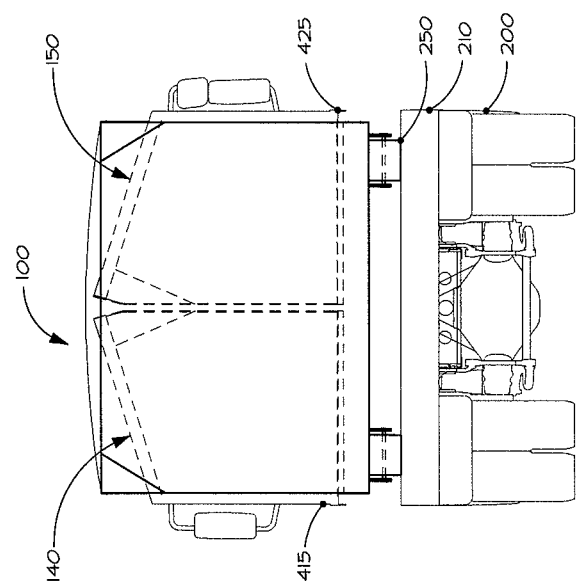
FIG. 4 is a rear elevation view of a roll-off container on a truck as in FIG. 2.
Figure 5:
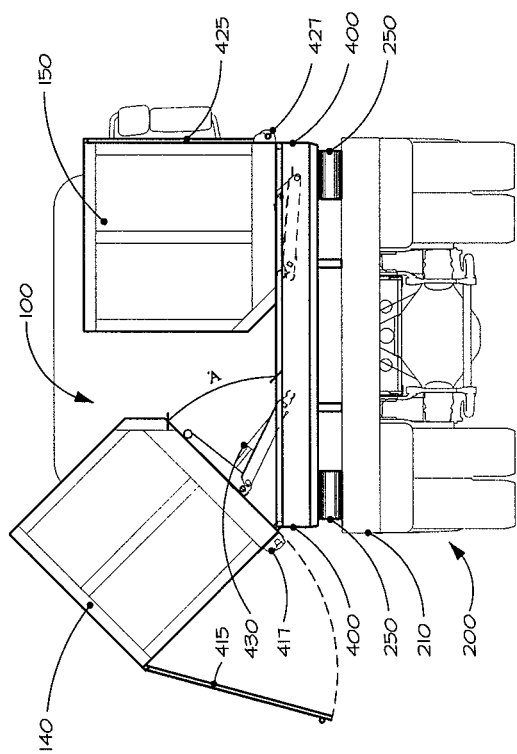
FIG. 5 is a rear elevation view of a roll-off container on a truck as in FIG. 4 with the containers being emptied.

FIGS. 4-5 show roll-off container 100 on the bed 210 of truck 200. Compartments 140, 150 are shown on each side of roll-off container 100 supported by roll-off chassis 400. Roll-off chassis 400 is a device configured and designed to attach various components to roll-off container 100. All components are housed within or on top of roll-off chassis 400. Roll-off chassis 400 is preferably configured in standard roll-off container lengths, but may be any length to accommodate any configuration of compartments mounted thereto. Chassis 400 may be formed of any structural material suitable for the application, including aluminum or steel.

Roll-off chassis 400 includes dump hoists 430. Dump hoist 430 is a mechanical device configured and designed to lift weight as required by applied loads, such as the weight of compartment 140, 150 when filled with materials. Dump hoists 430 are housed within chassis 400, along with a control panel and a motor, such as a 12 volt, 1.5 HP motor. Roll-off chassis 400 will include at least one dump hoist 430 corresponding to each compartment 140, 150, so that each compartment may be emptied or dumped independently of the others.

Dump hoist 430 should have a dumping range to tilt each compartment 140, 150 at an angle a as desired to empty or dump the contents of compartment 140, 150. In typical implementations, angle a can range from about 0° to about 120°, including various angles of about 20°, 30°, 45°, 60°, and 90°. It is to be understood that angle a is not limited to any particular angle. Dump hoist 430 is attached to the bottom surface of each compartment 140, 150 and is designed to lift the medial side of each compartment 140, 150 to permit dumping from the side or rear of compartments 140, 150. These angles are measured from the plane of chassis 400. Pre-manufactured dump hoists 430 may be utilized from any manufacturer, as long as they meet weight and dumping angle requirements. Dump hoist 430 should be configured and sized for the particular application taking into account the size and intended contents of compartment 140, 150. A typical dump hoist 430 would include a 2.6 to 4 ton hoist cylinder and a manifold.

Compartments 140, 150 are fastened to dump hoist 430 by pivotal connectors as known to those of skill in the art. For example, bolt connections may be used to permit dump hoist 430 to extend its arm and pivot compartment 140, 150 to an angle of about 0° to about 120°, but is not limited thereto.

Compartments 410, 420 include side doors 415, 425 that are shut when the compartments are in their normal position for filing or transport. Forged latches 417, 427 keep doors 415, 425 from opening when in this position. When compartments 140, 150 are raised to the dumping position, as shown in FIG. 5, forged latches 417, 427 are unlatched to permit doors 415, 425 to swing open to empty or dump the contents of compartments 140, 150.

Latch 417 may be operated manually, without the use or necessity of the cylinder. Latch 417 may be housed in connection with the cylinder within the sidewalls of compartment 140. The latch cylinder can be attached with any known connectors, such as bolts or welds. Latch 417 may be attached to the cylinder with any known connection device, such as bolt connections which will operate the range of motion of latch 417. The cylinder may similarly be housed within the sidewalls of compartment 140 and fastened with any known connectors, such as bolts or screws.

Figure 6:
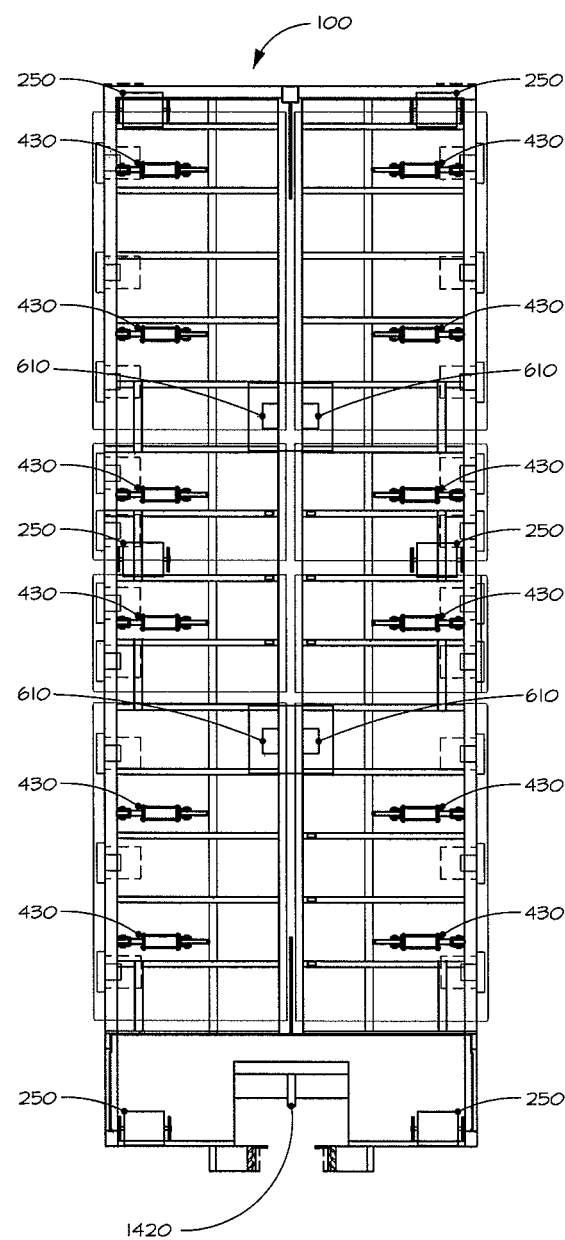
FIG. 6 is a plan view of the chassis for a roll-off container as shown in FIGS. 4-5.

FIG. 6 shows roll-off container 100 that includes dump hoists 430 that are housed within roll-off chassis (shown in FIGS. 4-5). In the implementation shown in FIG. 6, 12 dump hoists 430 are shown, each of which would correspond to a compartment as shown in FIGS. 1-3. In this way, each compartment can be emptied or dumped separately.

FIG. 6 also shows hydraulic manifolds 610 located between several dump hoists 430. Hydraulic manifold 600 is a mechanical device designed to operate dump hoist 430. Alternatively, hydraulic pumps could be used with a pump associated with each dump hoist 430. A typical hydraulic pump used with the system would be a 2 gallon per minute hydraulic pump. Hydraulic manifolds 610 could be operated by the gasoline engine or tarping system of the truck through the plug shown in FIG. 2, or by a separate gasoline or propane engine 900, or by solar power 1350, battery power, electric power, or other types of power supplies known or developed by those of ordinary skill in the art. Other options for powering hydraulic manifolds 610 may be used as known or discovered by those of ordinary skill in the art.

Roll-off chassis 400 houses dump hoist 430, which can be fastened with any appropriate connectors known to those of skill in the art, such as bolts, welds, or the like. In a typical implementation, dump hoists 430 are placed in a configuration according to their associated compartments located above each hoist. An individual manifold 610 is placed next to associated hoist 430 within roll off chassis 400 or one main manifold 610 servicing all hoists 430 is placed on chassis 400 fastened with connectors known to those skilled in the field.

Dump hoists 430 are connected to manifold 610 through connections such as hydraulic tubing which holds pressurized fluids in order to operate dump hoists 430. Compartments are placed over roll off chassis 400 and fastened with pivotal connectors, such as heavy duty metal hinges.

Figure 7:
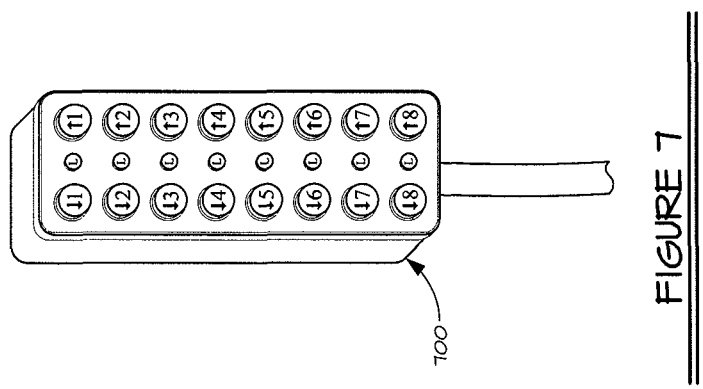
FIG. 7 is a perspective view of a master controller used to control a roll-off container such as shown in FIG. 1.

FIG. 7 shows master controller 700 that is used to control various functions of roll-off containers. Master controller 700 is in electrical communication with roll-off container 100 includes controls to raise and lower each dump hoist 430 by operating the corresponding hydraulic pump 600. Term "electrical communication" is intended to mean by a wire, radio waves, or other types of communication between master controller 700 and roll-off container 100. In this way, each compartment is controlled independently of each other compartment permitting each to be loaded or emptied independently. Master controller 700 may also include controls for opening the latch for each compartment. Master controller 700 may be electrically connected directly to each hydraulic pump 600, or to the engine 900 or dump hoist 430. Master controller 700 includes separate controls corresponding to each compartment. Master controller 700 could be located within the cab 210 of the truck 200 or elsewhere on the roll-off container 100.

FIG. 8 shows nine potential compartment configurations for roll-off containers 100, along with corresponding master controllers 700 to control each. The configurations demonstrate the use of 2, 4, 6, 8, or 10 separate compartments and corresponding master controllers 700. Each of these implementations show the compartments arranged symmetrically about the midline of roll-off container 100. The configurations are not so limited. Other configurations could include two compartments on one side and four on the other; or, a single container may be used on one side and three on the other. The configuration of the various compartments of roll-off container 100 may be designed in any way desired to meet the needs of the application.

Figure 9:
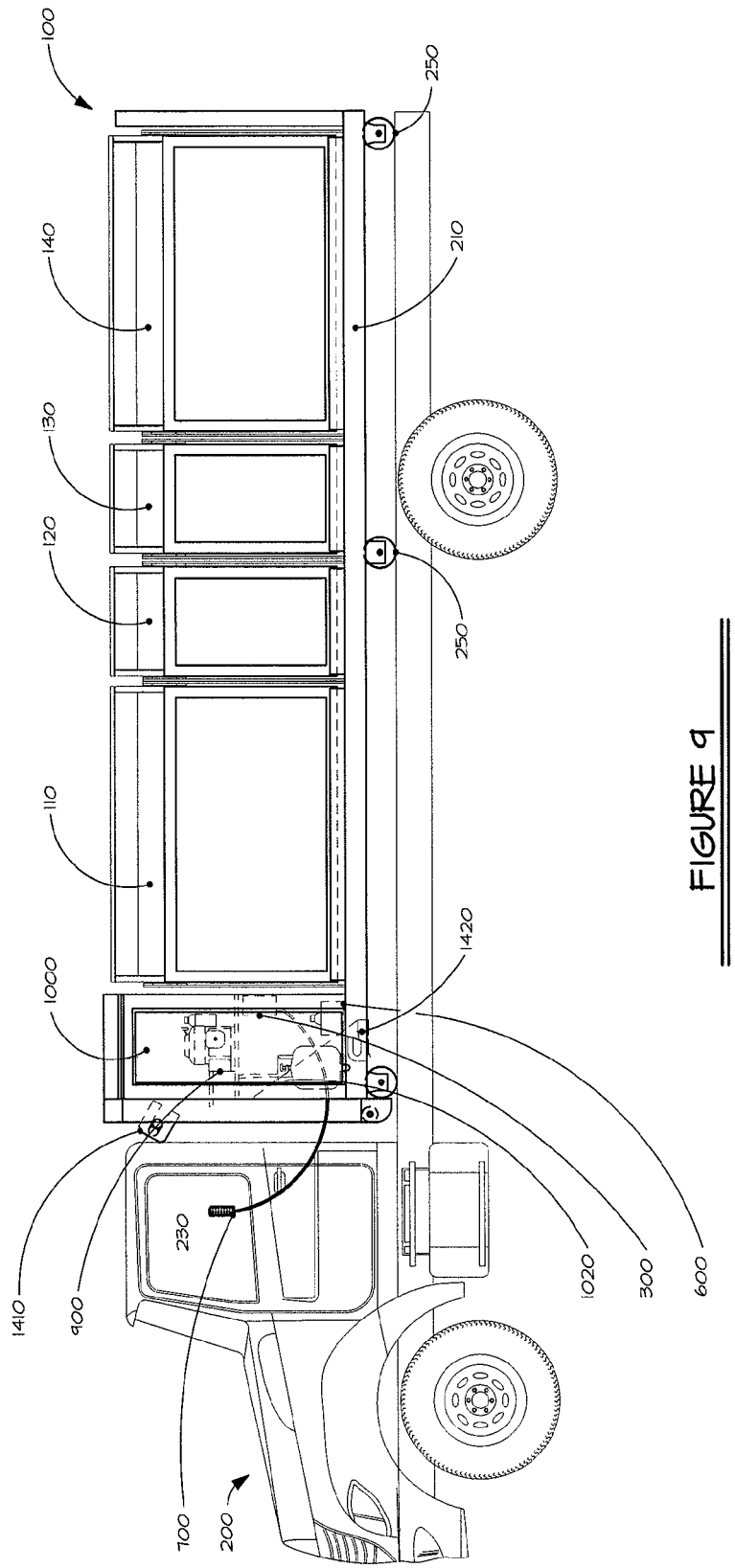
FIG. 9 is a side elevation view of a roll-off container on a truck as in FIG. 2, powered by a propane tank.

FIG. 9 shows roll-off container 100 that includes compartments 150, 160, 170, 180 as in FIG. 2. Roll-off container 100 has been loaded onto truck 200; wheels or casters 250 of roll-off container 100 rest on truck bed 210. A connection, such as plug 220, provides power from truck 200 to roll-off container 100 to permit dumping of compartments 150, 160, 170, 180 remotely from within cab 230 of truck 200.

Several components of roll-off container 100 are shown within motor housing 1000. Control panel 300 contains controls for operating various components of roll-off container 100. Engine 900, that may be a propane engine, is housed in motor housing 1000.

Propane engine 900 is used to power the dump hoists as described above. Within housing 1000, LP tank 910 provides a store of propane to propane engine 900, as well as pump and reservoir 600. In this way, roll-off container 100 is separately powered and run and does not need to use power from truck 200. This permits dumping of compartments 110, 120, 130, 140 when roll-off container 100 is separate from truck 200, such as at a collection or construction site. In one implementation, a 6.5 HP propane engine with an electric start may be utilized with a 20 lbs. LP tank.

Figure 10:
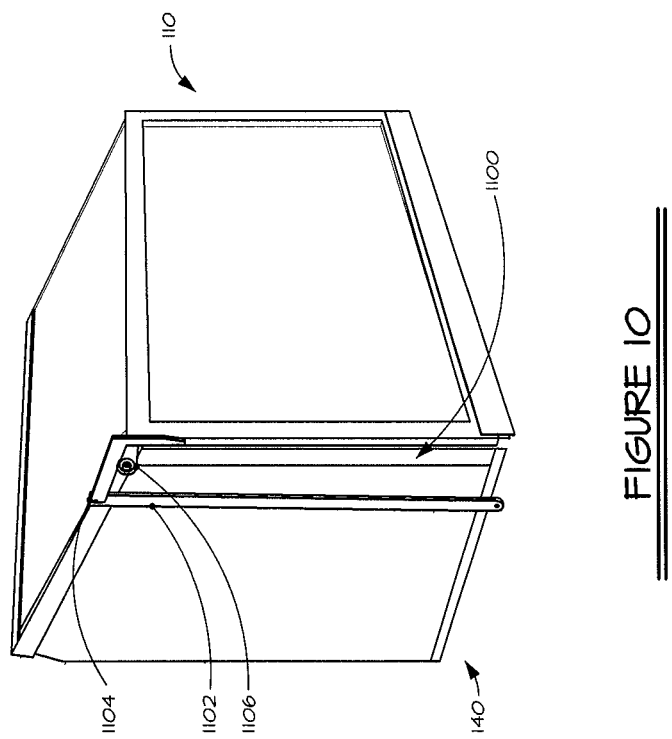
FIG. 10 is a perspective view of a single compartment as shown in the roll-off container of FIG. 1.
Figure 11:
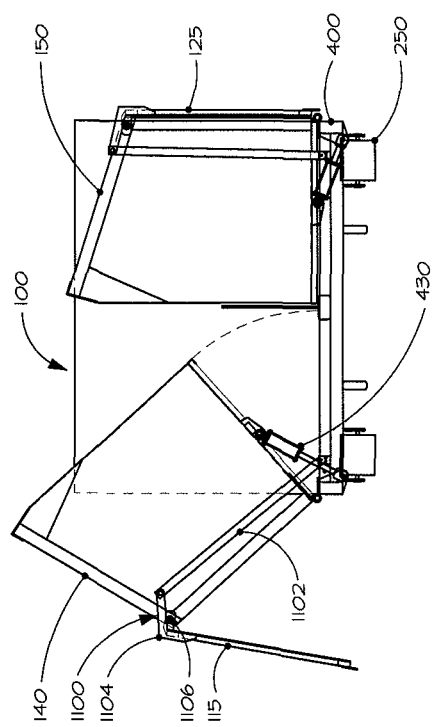
FIG. 11 is a side elevation view of a compartment as shown in FIG. 10 being emptied.

FIG. 10 shows a single compartment 110 as used in roll-off container 100. FIG. 11 shows compartment 110 being emptied or dumped from roll-off container 100. Door latch system 1100 is used to keep compartment door 115 in a closed position when compartment 110 is in a loading position, and to permit compartment door 115 to swing open (shown in FIG. 12) when the contents of compartment 100 are being emptied or dumped. Door latch system 1100 includes arm 1102 connected to chassis 400 at its lower end and pivotably attached to elbow bracket 1104 at its upper end. Elbow bracket 1104 rests on knob 1106. When in the closed position, door 115 is prevented from opening as door is prevented from swinging open by knob 1106 fitting snugly within elbow bracket 1104. When compartment 110 is raised by dump hoist 1150, elbow bracket 1104 pivots on arm 1102 permitting elbow bracket 1104 to slide along knob 1106 providing space that permits door 115 to swing open and empty the contents of compartment 110.

Figure 12:
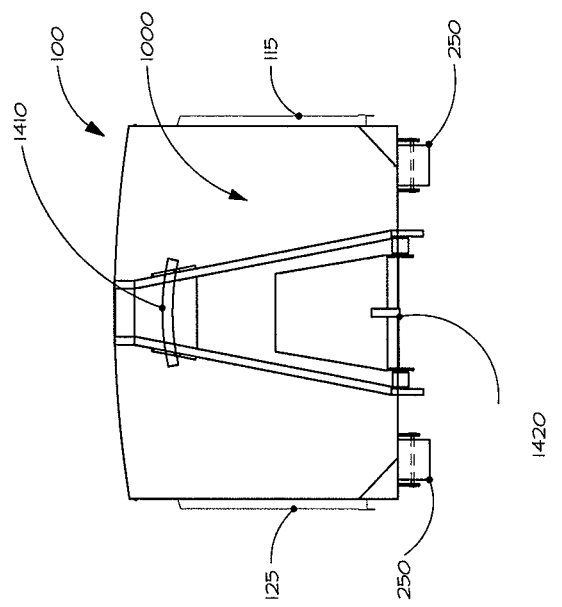
FIG. 12 is a front elevation view of a roll-off container as in FIG. 1.

FIG. 12 shows a roll-off container 100 that includes hook lift attachment 1410 and cable rail attachment 1420. One or both of hook lift attachment 1410 and cable rail attachment 1420 can be attached to an end of roll-off container 100, such as to housing 1000. Hook lift attachment 1410 permits roll-off container 100 to be hoisted onto a roll-off truck by use of a standard hook lift device on the truck. Similarly, cable rail attachment 1420 permits roll-off container 100 to be hoisted onto a roll-off truck by use of a standard cable rail device on the truck. Typically, only one or the other such device is used at a time, but roll-off container may be equipped with one or both devices to provide versatility in use with roll-off trucks equipped with either standard type of loading system.

In another implementation, the dump hoists may be powered by solar power. A typical arrangement would include a 12 VDC power unit (solar panel), solar charger, and battery cables, although other solar power configurations may also be used.

Figure 13:
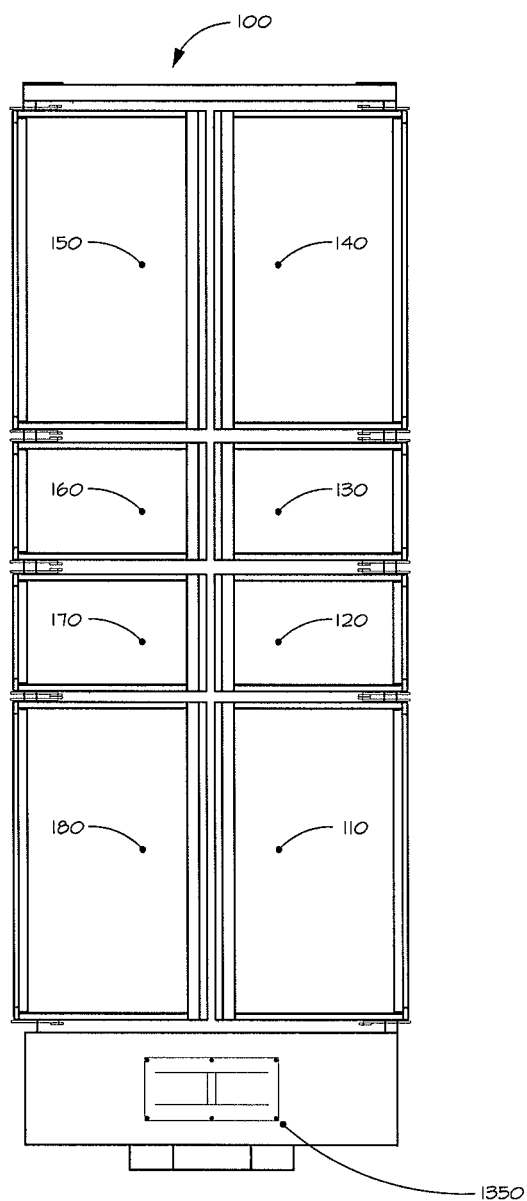
FIG. 13 is a plan view of a roll-off container as shown in FIG. 1.

An example of such an implementation is shown in FIG. 13. Roll-off container 100 is shown with 8 compartments 110, 120, 130, 140, 150, 160, 170, 180. Solar panel 1350 collects sunlight to charge the remaining motor equipment within housing 1000.

Master controller 700 is preferably operable from the cab of the vehicle, but may also be operated from other locations including outside the vehicle. Master controller 700 may be connected to roll-off container 100 by a removable male/female plug or similar connection. The male/female plug connects to hydraulic pump 600, dump hoists 430, as well as the cylinders (if equipped) to permit master controller 700 to control operation of each component of the system.

The apparatus and system described herein provides an efficient way to separate, transport, and disperse material by having several dumping compartments. The materials are separated into individual dump compartments. When the roll-off container is filled, the unit is rolled onto a typical roll-off dumpster truck and hauled off. The separated materials are brought to a desired location where the dump compartments selectively release the stored material into a specified area.

Upon arrival, the truck is lined up with a desired dumping location, the operator then presses a button on master controller 700 associated with the specified dump compartment being dumped. The button activates hydraulic pump 600, which extends associated dump hoist 430 in order to dump the content from the dump compartment. Once emptied, dump hoist 430 is contracted by pressing a corresponding button on master controller 700. Also controlled from the master controller 700 is the cylinder (if equipped) built into the side wall of compartment 140. The cylinder in turn controls latch 427 releasing the door on compartment 140. When the compartment 140 is back to its original position, pushing the button on master controller 700 will lock forged latch 427 into position to prevent the doors from opening.

All aforementioned parts are generally available for purchase through existing manufacturers or can be constructed and assembled. All connections can be made as known to those of skill in the art, such as by bolting and welding the parts together in a configuration as described above.

The number of dump compartments and their sizes can be configured in any way as desired according to specified use of the roll-off container. All parts working in direct association with the dump compartments will have to be adjusted accordingly otherwise all other parts should stay consistent in their makeup and placement.

The apparatus and system described herein may be used by an operator retrieving the roll-off container from a site in a similar way as a traditional roll-off dumpster. The roll-off container is then brought to desired location at which point the operator lines up the container with a desired dump location. The operator selects the appropriate button on the master controller associated with the dump compartment desired to raise that compartment. The operator next presses the button on the master controller to release the latch holding the compartment door closed, thereby dumping the content from that compartment. The operator then presses the button on the master controller associated with that dump compartment to return the compartment to the lowered position. Finally, the operator presses the corresponding button on the master controller to close the forged latch to re-lock the dump compartment door. Alternatively, the door may be locked manually.

The roll-off container described herein can utilize any configuration of dump compartments desired for any use. For example, the roll-off container is ideally suited for separating, hauling, and selectively dumping recycled content from construction sites. The roll-off container is appropriate for use in schools, recycle convenience centers, curb side recycling, or by state, local, and federal government agencies. Commercial uses of the roll-off container include offices, apartment complexes, sustainable communities, manufacturing, retail, medical, restaurants, transportation, trade, and wholesale environments. The containers can haul and distribute materials such as aggregate, mulch, sand, compost, soil, fertilizers, seed, grain, and numerous other products.

While the invention has been described in conjunction with specific exemplary implementations, it is evident to those skilled in the art that many alternatives, modifications, and variations will be apparent in light of the foregoing description. Accordingly, the invention is intended to embrace all such alternatives, modifications, and variations that fall within the scope and spirit of the appended claims.

What is claimed is:

1. A roll-off container comprising:
    a chassis that includes wheels or casters, the chassis configured to be loaded and unloaded from a roll-off truck;
    two or more compartments supported on the chassis; and
    at least one separate dump hoist associated with each compartment, configured to permit each compartment to be dumped independently of the other compartments, the dump hoist being supported on the chassis.

2. The roll-off container of claim 1, wherein each dump hoist is configured to tilt each compartment at an angle of about 0° to about 120° from a plane of the chassis.

3. The roll-off container of claim 1, wherein each compartment includes a door that opens to permit emptying of contents of the compartment.

4. The roll-off container of claim 1, wherein the compartments are of sufficient size to hold at least one cubic yard of material.

5. The roll-off container of claim 1, wherein each dump hoist is operated by a hydraulic pump associated with the dump hoist.

6. The roll-off container of claim 1, wherein the truck is powered by an engine and includes a tarping system; the dump hoists are powered by the engine or tarping system of the truck.

7. The roll-off container of claim 1, wherein the dump hoists are powered by a gasoline engine, a propane engine, solar power, battery power, or electric power.

8. The roll-off container of claim 1, further comprising an engine that operates the dump hoists.

9. The roll-off container of claim 8, further comprising a master controller in electrical or wave communication with the engine.

10. The roll-off container of claim 9, wherein the master controller includes controls to raise and lower each dump hoist independently of the other dump hoists associated with another compartment.

11. The roll-off container of claim 8, wherein the engine is located within a housing supported by the chassis, the housing being separate from the compartments.

12. The roll-off container of claim 1, including 2, 4, 6, 8, or 10 compartments.

13. The roll-off container of claim 9, wherein the master controller is operable from a cab of the truck and is connected to the roll-off container by a male/female plug.

14. A roll-off container comprising:
    a chassis that includes wheels or casters, the chassis configured to be loaded and unloaded from a roll-off truck;
    two or more compartments supported on the chassis;
    a separate dump hoist associated with each compartment, configured to permit each compartment to be dumped independently of the other compartments, the dump hoist being supported on the chassis; and
    an engine supported on the chassis that is used to power the dump hoists.

15. The roll-off container of claim 14, wherein the engine comprises:
    a propane engine;
    a propane tank that provides a store of propane to the propane engine.

16. The roll-off container of claim 15, wherein the engine further comprises a hydraulic pump powered by the propane engine that operates the dump hoists.

17. The roll-off container of claim 14, wherein the engine comprises:

one or more solar panels located on an external surface of the roll-off container;

a solar charger connected to the one or more solar panels; and a battery connected to the solar charger.

18. The roll-off container of claim 14, wherein each dump hoist is configured to tilt each compartment at an angle of about 0° to about 120° from a plane of the chassis.

19. The roll-off container of claim 18, wherein each compartment includes a side or rear door that opens to permit emptying of contents of the compartment.

20. The roll-off container of claim 19, wherein each door includes a door latch system to permit the door to open when the compartment is tilted and to keep the door closed when the compartment is not tilted.

21. A system comprising:
 a plurality of separate compartments, each compartment having a bottom surface, a medial side and a lateral side;
 a plurality of dump hoists, each connected to the bottom surface of one of the plurality of compartments, for lifting the medial side of the compartment and emptying the compartment independently of the other compartments;
 an engine for powering the dump hoists;
 a plurality of doors, each pivotably attached to one of the plurality of compartments and forming a lateral wall for the compartment;
 a plurality of door latch systems, each attached to one of the plurality of doors configured to permit the door to open when the compartment is lifted and to keep the door closed when the compartment is not lifted;
 a master controller in electrical connection with the engine or the plurality of dump hoists that controls the lifting of the medial side of each compartment independently of the lifting of each other compartment; and
 a chassis that includes wheels or casters for supporting the plurality of compartments and the engine, the chassis configured to be loaded and unloaded from a roll-off truck.

22. The system of claim 21, wherein the engine is located within a housing that is separate from the plurality of compartments, the housing being supported on the chassis.

23. The system of claim 22, wherein the housing includes at least one of a hook lift attachment or a cable rail attachment.

24. The system of claim 21, wherein the engine is a gasoline engine, an electrical power system, a battery power system, a propane engine, or a solar power system.

25. The system of claim 21, wherein the plurality of dump hoists are hydraulic hoists.

26. The system of claim 21, wherein the master controller has separate controls for each of the plurality of compartments.

* * * * *